UNITED STATES PATENT OFFICE.

HUGH G. SMILEY, OF CHICAGO, ILLINOIS, ASSIGNOR TO ARTHUR G. SMILEY, OF SAN FRANCISCO, CALIFORNIA.

ADHESIVE COMPOSITION.

SPECIFICATION forming part of Letters Patent No. 556,700, dated March 17, 1896.

Application filed December 24, 1894. Serial No. 532,872. (No specimens.)

*To all whom it may concern:*

Be it known that I, HUGH G. SMILEY, a citizen of the United States, residing at Chicago, in the county of Cook and State of Illinois, have invented a certain new and useful Gum Compound, of which the following is a specification.

My invention relates to a process of manufacturing a compound and to a compound or product designed for various purposes, and particularly to act as a substitute for glue and the like in binding books and tablets and in fastening labels to metal and the like where glue is not ordinarily satisfactory, and for sealing papers and the like, and for various other such purposes.

I make my composition or compound in substantially the following manner: I provide a suitable vat or receptacle, and I can illustrate the proportions of the several ingredients by taking the formula for a certain quantity of the substance. For example, I take two hundred pounds of glue, preferably the best, four hundred pounds of pure water, one hundred pounds of white or granulated sugar, one hundred pounds of glucose, ten pounds of chloride of calcium, and one hundred pounds of a "rubber solution," so called. This rubber solution I make by taking, say, about fifteen parts of the best grade of Para washed rubber and dissolving it in, say, five hundred parts of benzine until a sticky mucilaginous mass is produced. I also add another ingredient, which is varied in proportion or quantity according to the season and the condition of the weather and other like conditions respecting the temperature and moisture of the atmosphere at the time or in the place where the compound is being prepared. The exact quantity of the ingredient, therefore, must be left in a considerable degree to the judgment and skill of the person making up the compound. With the proportions above indicated of the other ingredients, speaking generally, I add in summer one hundred pounds, in winter two hundred pounds, of glycerine. This entire mixture so prepared is stirred, mixed, and dissolved, and boiled, preferably by means of a water-jacketed boiling-tank. I find that the best result is from the use in this tank of water in the proportion of eighty gallons of water to ten pounds of salt. I am careful during the process of this boiling, and keep the other vapors and gases and the like from mingling with the substance. To this product I add, after the boiling process has been completed sufficiently to bring the whole to a thoroughly mixed and dissolved sticky compound, a quantity of oil, preferably essential oils, the quantity being sufficient to remove the smell of benzine, and of course, therefore, the quantity will have to vary under different conditions. I may also, as desired, apply proper coloring-matter in this connection, the coloring-matter being commonly aniline dyes, dissolved in suitable acids or otherwise prepared, as occasion may require. This substance so constituted is then permitted to solidify and is cooled. Thereupon it may be formed into the proper sizes and shapes and is sold for use in that condition.

In the application the solid pieces should be heated and dissolved as, perhaps, ordinary glue. This substance so constituted it is found will remain, when applied in thin sheets or layers or by a brush, permanently soft, flexible, and elastic. It is not reduced by heat or hardened by cold sufficiently to interfere with its ordinary use, as hereinafter referred to. It serves for all the ordinary purposes of gum or mucilage or glue. It serves as a backing or binding for books, tablets, and the like, also as a seal to attach adjacent surfaces of paper, and also as a means for applying labels to metallic substances, cans, and the like. It also has many other like uses which will readily occur and some doubtless that experience will have to suggest.

Of course the proportions I have given are what present experience suggests as substantially right for the best results; but they might be somewhat varied, and some of them might be considerably varied, without materially affecting the compound. I would not therefore wish to be limited to the precise proportions indicated. I have myself made and used like compounds in which there is considerable variation; but the proper proportions can always be determined by the character of the result or product under any given conditions. The essential end aimed at is the production of a gum which when applied will be permanently soft and flexible and preferably elastic.

I claim—

1. An adhesive composition consisting of glue, water, white sugar, glucose, chloride of calcium, a solution of rubber and glycerine in substantially the proportions indicated.

2. An adhesive composition consisting of glue, water, white sugar, glucose, chloride of calcium, a solution of rubber and glycerine in substantially the proportions indicated, and essential oil sufficient to relieve the finished product from the smell of benzine.

3. An adhesive composition consisting of glue, water, white sugar, glucose, chloride of calcium, a solution of rubber and glycerine in substantially the proportions indicated, and essential oil sufficient to relieve the finished product from the smell of benzine, and suitable coloring-matter.

HUGH G. SMILEY.

Witnesses:
KNELL VAN EWRA,
CHARLES S. MORTON.